United States Patent [19]

Toyoshima et al.

[11] Patent Number: 5,036,141
[45] Date of Patent: Jul. 30, 1991

[54] MODIFIED POLYOLEFIN RESIN

[75] Inventors: Yoshiki Toyoshima; Mitsuyuki Okada, both of Ichihara; Takeshi Fujii, Chiba; Kentaro Yamaguchi; Mitsuji Tsuji, both of Ichihara, all of Japan

[73] Assignee: Sumitomo Chemical Company, Limited, Osaka, Japan

[21] Appl. No.: 556,851

[22] Filed: Jul. 24, 1990

Related U.S. Application Data

[63] Continuation of Ser. No. 273,481, Nov. 21, 1988, abandoned.

[30] Foreign Application Priority Data

Nov. 20, 1987 [JP] Japan .................... 62-294751

[51] Int. Cl.$^5$ ............................ C08F 269/00
[52] U.S. Cl. ........................ 525/286; 525/284
[58] Field of Search .................. 525/284, 286

[56] References Cited

U.S. PATENT DOCUMENTS 3,708,555 1/1973 Gaylord .
3,868,433 2/1975 Bartz et al. .................... 525/286
4,762,882 8/1988 Okano et al. .................... 525/286

FOREIGN PATENT DOCUMENTS 0225186 6/1987 European Pat. Off. .
2023154 11/1970 Fed. Rep. of Germany .
44-7347 3/1969 Japan .................... 525/286

*Primary Examiner*—John C. Bleutge
*Assistant Examiner*—Vasu Jagannathan
*Attorney, Agent, or Firm*—Stevens, Davis, Miller & Mosher

[57] ABSTRACT

According to the present invention, there is provided a modified polyolefin resin having the following merits:
(1) The amount of bound unsaturated carboxylic acid, a derivative thereof or unsaturated epoxy compound is high.
(2) The change of the melt flow rate during the modification is small.
(3) The physical properties are of high grade.
(4) The transparency is improved due to the graft of unsaturated aromatic compound.

The modified polyolefin resin of the present invention can be used for adhesives, covering materials, binders, laminate bonding agent and polymer alloy constituents.

8 Claims, No Drawings

MODIFIED POLYOLEFIN RESIN

This application is a continuation of application Ser. No. 07/273,481, filed Nov. 21, 1988 now abandoned.

The present invention relates to a polyolefin resin modified with at least one unsaturated carboxylic acids, derivatives thereof or unsaturated epoxy compounds.

Polypropylene and polyethylene are typical polyolefin resins. Since such resins have many advantages in physical, chemical and mechanical properties and in processability, and attain economical benefits, they are used in industry in a wide field.

However, it is difficult to prepare a composite material or laminated material consisting of a polyolefin resin and metals, glass or polar polymers. Because the resin has a non-polar property and has a poor adhesiveness or an affinity with the above consituents.

For this reason, modification of polyolefin resins has been well known and widely taken into practice. The modification comprises grafting an unsaturated carboxylic acid or its derivative, acrylic acid or maleic anhydride for example, onto a polyolefin resin. As a result, polar groups are introduced in the chain of resin molecule.

However, the conventional modification has some disadvantages. It leaves much monomer unreacted in the modified product due to the low graft efficiency of the unsaturated carboxylic acid or its derivative. Additionally, it gives a modified product of low grade due to the drastic change in melt flow rate during the graft reaction.

In order to avoid the disadvantages, JP-A-55-50040 has proposed a process comprising admixing a rubber to a polyolefin resin. JP-A-53-1291 has proposed a process comprising kneading a polyolefin resin in the presence of an aromatic hydrocarbon containing a tertiary or secondary alkyl or an aromatic hydrocarbon containing at least three primary alkyls. And JP-A-52-93495 has proposed a process comprising subjecting a polyolefin resin to a free-radical reaction in the presence of a polyalkylbenzene.

Although the graft amount can be improved according to the process disclosed in JP-A-55-50040, the process requires a divisional addition of the graft monomer and free-radical initiator and a long period of reaction time. These features are not economically beneficial. Moreover the process accompanies another demerit that it gives a modified product having too high melt flow rate.

Although the process disclosed in JP-A-53-1291 exhibits an advantageous effect when it is applied to a crosslinked polyolefin composed mainly of ethylene, the reference contains no exemplary disclosure about the decomposable polyolefin composed mainly of propylene and no advantageous effect is expected in this case.

Although the graft amount can be improved according to the process disclosed in JP-A-52-93495, the reference is quite silent about the change of the fluidity (melt flow rate) of the product after the graft modification and no advantageous effect is expected. Moreover, the process accompanies another demerit that the melt-kneading process gives a modified product containing polyalkylbenzene as an impurity since polyalkylbenzene has a high boiling point.

U.S. Pat. No. 3,708,555, a patent family of JP-A-46-1679, proposes a process comprising allowing react a mixture of maleic anhydride and styrene with a polyolefin resin. However, in the process, a large amount of styrene compared with maleic anhydride is required and no free-radical initiator is used. As a result, the modified product thus obtained has a small amount of graft maleic anhydride and contains a large amount of maleic anhydride unreacted and styrene homopolymers formed through the side reaction. Accordingly the modified product shows a low mechanical strength and cannot be of practical use.

The object of the present invention is to provide a modified polyolefin resin having a high graft amount of at least one unsaturated carboxylic acids and other desirable properties. The modified polyolefin resin is obtained by melt-kneading a mixture consisting of a polyolefin resin, at least one compound selected from the group consisting of unsaturated carboxylic acids, the derivatives thereof and epoxy compounds, an unsaturated aromatic monomer and a free-radical initiator in a specific ratio. And the process has an advantage that the fluidity of the resin (melt flow rate) is almost unchanged during the melt-kneading.

According to the present invention, there is provided a modified polyolefin resin obtained by melt-kneading a mixture consisting of (A) 100 parts by weight of a polyolefin resin having a melt flow rate of 0.05–60 g/10 min., (B) 0.1–5 parts by weight of at least one compound selected from the group consisting of unsaturated carboxylic acids, the derivatives thereof and epoxy compounds, (C) 0.1–5 parts by weight of an unsaturated aromatic compound and (D) 0.01–2 parts by weight of a free-radical initiator, the molar ratio of (B)/(C) ranging from 1/0.1 inclusive to 1/1 exclusive.

As the polyolefin resin (A) having a melt flow rate of 0.05–60 g/10 min, various olefin homopolymers and olefin copolymers can be used. Specific examples thereof are low-density polyethylene, linear low-density polyethylene, high-density polyethylene, crystalline polypropylene, crystalline propylene copolymer (propylene-ethylene random copolymer, propylene-ethylene block copolymer, propylene-butene-1 copolymer, propylene-4-methylpentene-1 copolymer, propylene-ethylene-butene-1 terpolymer) polybutene-1, poly-4-methylpentene-1, ethylene-vinyl acetate copolymer, ethylene-methyl methacrylate copolymer, ethylene-methyl acrylate copolymer, ethylene-ethyl methacrylate copolymer, ethylene-ethyl acrylate copolymer, ethylene-butyl methacrylate copolymer, ethylene-butyl acrylate copolymer, ethylene-methacrylic acid copolymer, ethylene-acrylic acid copolymer and the partial metal salt thereof, ethylene-methacrylic acid-methacrylic acid ester terpolymer, ethylene-acrylic acid-methacrylic acid ester terpolymer, ethylene-acrylic acid-acrylic acid ester terpolymer, ethylene-methacrylic acid-acrylic acid ester terpolymer, ethylene-vinyl alcohol copolymer, ethylene-vinyl acetate-vinyl alcohol terpolymer and ethylene-styrene copolymer. These polyolefin resins can be used alone or in admixture thereof.

The melt flow rate of the polyolefin resin (A) falls in the range of 0.05–60 g/10 min, preferably 0.1–50 g/10 min. However, it may be controlled so that the melt flow rate of the modified polyolefin resin falls in the range of 0.1–100 g/10 min.

Consequently the more preferable range of the melt flow rate of the polyolefin resin (A) is 0.1–40 g/10 min for decomposable polyolefin resins such as crystalline polypropylene, crystalline propylene-ethylene random copolymer, polybutene-1, poly-4-methylpentene-1 and the like. It is 1–50 g/10 min for crosslinked polyolefin resins such as polyethylene, ethylene-vinyl acetate copolymer, ethylene-methacrylic acid ester copolymer, ethylene-acrylic acid ester copolymer, ethylene-vinyl alcohol copolymer and the like.

The melt flow rate is determined in accordance with ASTM D 1238. It is measured under the conditions of 230° C. and 2.16 kg for polypropylene resins, 190° C. and 2.16 kg for polyethylene and polybutene-1 resins and 260° C. and 5 kg for poly-4-methylpentene-1 resins.

When the melt flow rate of the polyolefin resin (A) is lower than 0.05 g/10 min, the production of modified polyolefin is difficult due to its low fluidity. By contrast when it is higher than 60 g/10 min, the mechanical properties of the modified polyolefin resin is undesirably lowered.

In the present invention, the number average molecular weight of the polyolefin resin (A) is usually 7,000–800,000, preferably 10,000–700,000.

In the present invention, the expression "polypropylene" refers to crystalline polypropylene, which includes propylene homopolymer, block copolymer and random copolymer of propylene and at least one alpha-olefin. The block copolymer can be produced by a process comprising polymerizing propylene at the first step and copolymerizing the resulting polypropylene with ethylene and/or at least one alpha-olefin such as butene-1 at the second step, for example. The random copolymer can be produced by copolymerizing propylene with ethylene and/or at least one alpha-olefin such as butene-1.

The above polymers can be produced by allowing to react the starting materials in the presence of the so-called Ziegler-Natta catalyst. Ziegler-Natta catalyst is a chemical complex of titanium trichloride and an alkyl-aluminum compound, for example.

The polymerization can be carried out at a temperature of 0°–300° C. However, it is usually carried out at 0°–100° C., because an elevated temperature of higher than 100° C. inhibits the production of highly stereoregular polymers.

The polymerization pressure is not critical. It is usually 3–100 atm in view of the practicality and cost effectiveness.

The polymerization can be carried out by a continuous process or a batch process.

It can be practiced by any of slurry polymerization, solution polymerization, bulk polymerization and gas phase polymerization. The slurry polymerization is carried out in an inert hydrocarbon solvent such as butane, pentane, hexane, heptane, octane etc. In the solution polymerization, the produced polymer is dissolved in the inert hydrocarbon solvent mentioned above. In the bulk polymerization, the polymerization is carried out in a liquid monomer without solvent. And in the gas phase polymerization, the polymerization is carried out in a gaseous monomer.

In order to control the molecular weight of the product, chain transfer agents such as hydrogen can be added during the polymerization.

The polypropylene used in the present invention can be produced with an isospecific Ziegler-Natta catalyst. Preferable are those having a high isospecificity.

More preferable are those containing a solid complex of titanium trichloride having a layer crystal structure or a magnesium compound and a titanium compound as the transition metal constituent and an organoaluminum compound as the typical metal constituent. And the catalyst may further contain a known compound having an electron-donating property as the third component.

Titanium trichloride used can be prepared by reducing titanium tetrachloride with a reducing agent of wide variety. Metals such as aluminum and titanium, hydrogen and organometal compounds have been known as the reducing agent. $TiCl_3AA$ is one of the typical examples of the titanium trichloride compositions produced through metal reduction. It is prepared by reducing titanium tetrachloride with metallic aluminum followed by pulverizing the reduction product with a ball mill or an vibration mill. Due to the process, it contains activated aluminum chlorides. The isospecificity, polymerization activity and particle shape of the $TiCl_3AA$ may be improved when a compound selected from ethers, ketones, esters, aluminum chloride and titanium tetrachloride is added during the pulverization.

When severe demands for heat resistance, stiffness and scratch resistance are encountered, it is preferable to use a highly crystalline polypropylene having the following properties for the present invention:

(1) An isotactic pentad of boiling heptane insoluble of propylene homopolymer portion of 0.970 or more, wherein the propylene homopolymer portion refers to the homopolymer portion of polypropylene or the homopolymer portion of propylene block copolymer which has been prepared as the first segment in the first step of the block polymerization process, (2) A boiling heptane soluble of not more than 5.0% by weight and (3) A 20° C. cold xylene soluble of not more than 2.0% by weight.

The isotactic pentad of boiling heptane insoluble, boiling heptane soluble and 20° C. xylene soluble are determined as follows:

(1) 20° C. cold Xylene soluble

5 Grams of polypropylene are dissolved in 500 ml of boiling xylene. Then the mixture is cooled to 20° C. and allowed to stand for 4 hours. Thereafter the mixture is filtered to remove the 20° C. xylene insoluble. Xylene is removed from the filtrate by a simple evaporation and then evaporation under reduced pressure at 60° C. to obtain a solidified 20° C. xylene soluble. The 20° C. xylene soluble is determined by dividing the dry weight of the solidified 20° C. xylene soluble by the weight of the sample used and it is represented by percent.

(2) Boiling heptane soluble

The above 20° C. xylene insoluble is dried and extracted with boiling n-heptane in a Soxhlet apparatus for 8 hours. Thus obtained residue is referred to as boiling heptane insoluble. The boiling heptane soluble is determined by subtracting the dry weight of the boiling heptane insoluble from the weight of the sample used (5 g) and dividing the resulting value by the weight of the sample used. It is also represented by percent.

(3) Isotactic pentad

Isotactic pentad refers to the fraction of a series of five successive isotactically-sequenced propylene monomer units in the total polymer chain. It is determined based on $^{13}C$-NMR measurements as disclosed in A. Zambelli et al., Macromolecules, 6, 925 (1973). And the NMR absorption peaks are assigned based on the subsequently published Macromolecules, 8, 687 (1975).

Specifically, the isotactic pentad is determined based on the relative ratio of the area of mmmm peaks to the total area of the absorption peaks assigned to methyl carbons. Applying the method to the NPL standard substance CRM No. M19-14 Polypropylene PP/MWD/2 provided by The National Physical Laboratory (United Kingdom) gave an isotactic pentad of 0.944.

The above-mentioned highly crystalline polypropylene can be obtained by any of the methods disclosed in JP-A-60-28405, JP-A-60-228504, JP-A-61-218606 and JP-A-61-287917.

When severe demands for impact resistance are encountered, it is preferable to use a propylene block copolymer, which contains propylene homopolymer portions prepared in the first step as the first segment and block copolymer portions of propylene and an alpha-olefin such as ethylene and butene-1 prepared in the second step of the block polymerization process as the second segment.

The propylene block copolymer can be prepared by slurry polymerization or gas phase polymerization. When severe demands for high impact resistance are encountered, the amount of the second segment should be raised. For this purpose, the gas phase polymerization method is preferably applied.

Such polypropylene having a high impact resistance can be obtained by the gas phase polymerization disclosed in JP-A-287917 for example.

In the propylene block copolymer, the propylene homopolymer portion prepared in the first step of the polymerization may consist of propylene monomer units only or may consist of propylene monomer units and alpha-olefin monomer units such as ethylene or an alpha-olefin having 4-6 carbon atoms, wherein the content of the alpha-olefin monomer units is 0-6 mole %, preferably 0-3 mole % based on the moles of the monomer units in the polymer produced in the first step.

The copolymer portion prepared in the second step of the polymerization preferably consists of ethylene monomer units only or consists of propylene monomer units and ethylene monomer units wherein the content of the ethylene monomer units is 10 mole % or more, preferably 20-70 mole % based on the total moles of the monomer units in the polymer produced in the second step or consists of monomer units of propylene, ethylene and an alpha-olefin having 4-6 carbon atoms. The propylene block copolymer contains 10-95% by weight of the copolymer portion based on the weight of the propylene block copolymer.

The content of the second segment in the propylene block copolymer for easy and stable production ranges 10-30% by weight for slurry polymerization, 10-95% by weight, preferably 20-80% by weight, more preferably 30-70% by weight for gas phase polymerization.

In gas phase polymerization, propylene block copolymers containing a large amount of the second segment can be prepared according to the process disclosed in Japanese patent application No. 62-256015. Such copolymers are suited for the use where an extremely high impact resistance is requested.

Although the intrinsic viscosity of the second segment in tetraline at 135° C. may be changed depending on the production efficiency, the physical properties of the product powder and the intrinsic viscosity of the first segment, it is approximately 3-8 dl/g for slurry polymerization and 1-5 dl/g for gas phase polymerization.

The unsaturated carboxylic acids used in the present invention as the constituent (B) include acrylic acid, methacrylic acid, maleic acid, itaconic acid, citraconic acid, bicyclo[2,2,1]hepta-5-ene-2,3-dicarboxylic acid (himic acid), bicyclo[2,2,2]octa-5-en-2,3-dicarboxylic acid, 4-methylcyclohexa-4-en-1,2-dicarboxylic acid, 1,2,3,4,5,8,9,10-octahydronaphthalen-2,3-dicarboxylic acid, bicyclo[2,2,1]octa-7-en-2,3,5,6-tetracarboxylic acid, 7-oxabicyclo[2,2,1]hepta-5-ene-2,3-dicarboxylic acid and the like. The derivatives thereof are acid anhydride, esters, amides, imides and metal salts. Specific examples thereof are maleic anhydride, itaconic anhydride, citraconic anhydride, bicyclo[2,2,1]-hepta-5-ene-2,3-dicarboxylic acid anhydride (himic acid anhydride: NBDA), monomethyl maleate, monomethyl fumarate, monomethyl itaconate, monomethyl fumarate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate and the like.

The unsaturated epoxy compounds are unsaturated glycidyl esters and unsaturated glycidyl ethers having the following formulas (1) and (2), respectively.

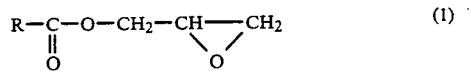

(1)

wherein R is a hydrocarbon group of 2-18 carbon atoms containing an ethylenic unsaturated bond.

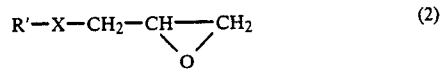

(2)

wherein R' is a hydrocarbon group of 2-18 carbon atoms containing an ethylenic unsaturated bond, X is —CH₂—O— or 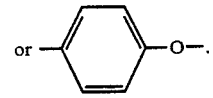

Specific examples of the epoxy compounds are glycidyl acrylate, glycidyl methacrylate, glycidyl itaconate, allyl glycidyl ether, 2-methyl allyl glycidyl ether, styrene p-glycidyl ether and the like.

The above-mentioned unsaturated carboxylic acids, the derivatives thereof and the unsaturated epoxy compounds can be used alone or in admixture of two or more.

Among those mentioned above, maleic anhydride, glycidyl acrylate or glycidyl methacrylate is preferably used.

Although styrene is preferable for the unsaturated aromatic compound (C) used in the present invention, o-methylstyrene, p-methylstyrene, m-methylstyrene, alpha-methylstyrene, vinyltoluene, divinylbenzene and the mixtures thereof can also be used.

The free-radical initiator used in the present invention is not critical and known ones can be used. Specific examples thereof are azo compounds such as 2,2'-azobisisobutyronitrile, 2,2'-azobis(2,4,4-trimethylvaleronitrile) etc.; organic peroxides such as methyl ethyl ketone peroxide, cyclohexanone peroxide, 3,5,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,5,5-trimethylhexanoyl peroxide, benzoyl peroxide, t-butyl peracetate, t-butylperoxyisobutyrate, t-butylperoxypivalate, t-butylperoxy2-ethylhexanoate, t-butylperoxy-3,5,5-trimethylhexanoate, t-butylperoxylaurate, t-butylperoxybenzoate, di-t-butyldiperoxyisophthalate, 2,5-dimethyl-2,5di(benzoylperoxy)hexane, t-butylperoxymaleic acid, t-butylperoxyisopropylcarbonate, polystyrene peroxide and the like.

In the present invention, the constituent (B) (at least one compound selected from unsaturated carboxylic acids, the derivatives thereof and epoxy compounds) is compounded in an amount of 0.1-5 parts by weight, preferably 0.2-3 parts by weight per 100 parts by weight of the polyolefin resin (A). The unsaturated aromatic monomer (C) is compounded in an amount of 0.1-5 parts by weight, preferably 0.2-2 parts by weight per 100 parts by weight of the polyolefin resin (A). The free-radical initiator (D) is compounded in an amount of 0.01-2 parts by weight, preferably 0.02-1 part by weight per 100 parts by weight of the polyolefin resin (A). And the molar ratio of (B)/(C) ranges from 1/0.1 inclusive to 1/1 exclusive.

When the amount used of the constituent (B) is less than 0.1 part by weight, no improvement of the qualities of the product is expected. By contrast, when it exceeds 5 parts by weight, the improvement hits the ceiling. And moreover, the product gives out an offensive smell, has a low adhesiveness and acts corrosively to molding apparatuses since it contains a lot of unreacted monomer. Accordingly, such a modified polyolefin resin is undesirable for practical use.

When the amount of the constituent (C) is less than 0.1 part by weight, almost no improvement of the qualities of the product is expected. When it exceeds 5 parts by weight, the improvement hits the ceiling. And moreover, the modified polyolefin resin obtained has a low mechanical strength due to the formation of homopolymers.

When the amount of the constituent (D) is less than 0.01 part by weight, the amount of graft of the constituent (B) is low and a lot of the unreacted constituent (B) remains in the polymer. Accordingly, such a modified polyolefin resin is undesirable for practical use. By contrast, when the amount of the constituent (D) exceeds 2 parts by weight, the amount of graft hits the ceiling. And moreover, the decomposition or crosslinking of the polyolefin resin occurs so frequently that the melt fluidity changes drastically during the modification. Consequently, such a modified polyolefin resin is undesirable for practical use.

When the molar ratio of (B)/(C) is less than 1/0.1, the modified polyolefin resin satisfying the objects of the present invention cannot be obtained due to low improvement in amount of graft of the constituent (B) and drastic change of the melt flow rate. The ratio over 1/1 causes formation of the homopolymer of the constituent (C) and reduction of the mechanical strength of the modified polyolefin resin produced. Accordingly, such a modified polyolefin resin is undesirable for practical use.

The melt flow rate of the modified polyolefin resin produced under the above-restricted conditions falls in the range of 0.1-100 g/10 min, preferably 0.5-50 g/10, more preferably 1-30 g/10 min.

The modified polyolefin resin of the present invention can be produced by melt-kneading (A) a specific polyolefin resin, (B) at least one compound selected form the group consisting of unsaturated carboxylic acids, derivatives thereof and unsaturated epoxy compounds, (C) an unsaturated aromatic compound and (D) a free-radical initiator with an extruder, a Banbury mixer or a kneader at 150°-300° C., preferably at 190°-280° C. for 0.3-10 minutes retention, preferably 0.5-5 minutes retention.

For industrial purpose, continuous production process is advantageous. The process is carried out with a single screw or twin screw extruder while maintaining the vent holes vacuous and therefrom removing by-products such as unreacted constituents (B), (C) and (D), the oligomers thereof and decomposition products. Although the reaction may be carried out in air, it is preferable to carry out the reaction under inert gas atmosphere such as in nitrogen or carbon dioxide. In order to thoroughly remove trace of the unreacted compounds or the by-products from the modified polyolefin resin produced, the resin may be subjected to a heat treatment at a temperature above 60° C., a solvent extraction or a drawing a vacuum with melting.

If necessary, to the modified polyolefin resin of the present invention can be added antioxidants, heat stabilizers, light stabilizers, nucleating agents, lubricants, antistatic agents, inorganic or organic fillers, inorganic or organic colorants, rust preventives, crosslinking agents, foaming agents, plasticizers, fluorescent agents, surface treating agents, surface brighteners and the like during the modification or the after-treatment.

The modified polyolefin resin of the present invention thus obtained can be used as an adhesive resin composition itself or can be made into an adhesive resin composition by incorporating a specific magnesium oxide and an unmodified polyolefin resin. The composition can be used as a covering material, a binder or a laminate bonding agent for various substances such as inorganic substances or metals.

The modified polyolefin resin of the present invention can be applied to the polymer alloy uses. Polyolefin resins, particularly polypropylenes, have been widely used for films and domestic appliances and are beginning to be used for automobiles in combination with rubbers and fillers.

In recent years, the advent of polymer alloys of engineering plastics has increased the demands for alloys having improved qualities. In order to satisfy the demands, which is becoming varied, many researches for improving and developping the qualities of the alloys has been made. For producing the alloy of polypropylene and the engineering plastic of high grade, the polypropylene should contain polar groups in the polymer chain and has the same good properties as ordinary polypropylenes. In view of the situation, the modified polyolefin resin of the present invention can be combined with polypropylene and an engineering plastic for producing polymer alloys.

With the modified polyolefin resin of the present invention, a wide variety of composite materials such as covering materials, laminates, reinforced resins and the like having an excellent adhesiveness can be produced by a conventional production technique. For example, for the production of covering materials or laminates are applied depending on the purpose powder coating such as fluidized bed dip coating, electrostatic coating and flame spray coating, solution coating, extrusion coating, dry lamination, hot pressing, insert molding or a combination thereof. The filled resin and fiber-reinforced resin can be produced by extrusion molding or injection molding.

The following examples serve to give specific illustration of the practice of the present invention but they are not intended in any way to limit the scope of the present invention.

The physical properties of the product were determined as follows:

(1) Melt flow rate

The melt flow rate was determined according to JIS K6758 (same as ASTM D1238). It was measured at 230° C. under a load of 2.16 kg so far as it is not said emphatically.

(2) Flexural Modulus

The test was carried out according to JIS K7203, wherein the flexural modulus was determined with a sample having a thickness of 3.2 mm under the conditions of a span length of 50 mm and a loading rate of 1.5 mm/min. The temperature at the measurement was 23° C. so far as it is not said emphatically. When the measurement was carried out at a temperature other than 23° C., the sample was subjected to the measurement after having been conditioned in a constant temperature bath for 30 minutes.

(3) Izod impact strength

The Izod impact strength was determined according to JIS K7110, wherein the thickness of the sample was 3.2 mm, the sample was notched and the measurement was carried out at 23° C. so far as it is not said emphatically. When the measurement was carried out at a temperature other than 23° C. the sample was conditioned in a constant temperature bath for 2 hours before the measurement.

(4) Amounts of bound maleic anhydride, glycidyl methacrylate and styrene

The amount of bound maleic anhydride in the modified polyolefin resin was determined as follows:

A small amount of the sample of the resin was dissolved in hot xylene. Adding anhydrous acetone thereto gave a precipitate of the purified sample. Then the precipitate was dissolved in xylene again. The resulting solution was titrated by methanol solution of sodium hydroxide with phenolphthalein as an indicator at an elevated temperature (110°–120° C.).

The amount of bound glycidyl methacrylate was determined as follows:

The epoxy contained in the resin was opened by dissolving the resin in a xylene-methanol-hydrochloric acid solution. The excess hydrochloric acid was back tritrated by a methanol solution of $NaOCH_3$ at an elevated temperature (110°–120° C.) with phenolphthalein as an indicator.

The amount of bound styrene was determined based on the intensity of the peak, which is assigned to substituted benzene ring, appearing in the infrared spectrum of the above-mentioned purified sample.

(5) Ethylene content in propylene-ethylene block copolymer

The ethylene content in propylene-ethylene block copolymer was determined by applying a calibration curve to the absorbance at the frequencies assigned to methyl ($—CH_3$) and methylene ($—CH_2—$) appearing in the infrared spectrum of a pressed sheet previously prepared.

The above sample for determining the physical property data was prepared according to the following injection molding conditions so far as it is not said emphatically:

The resin was dried at 120° C. for 2 hours with a hot-air oven. Thereafter it was injection molded with the IS150 E-V type injection molding machine manufactured by Toshiba Machine Co., Ltd. at a molding temperature of 240° C. and a mold-cooling temperature of 70° C. for 15 seconds for injection and 30 seconds for cooling.

EXAMPLE 1

With a Henschel mixer were uniformly mixed 100 parts by weight of a crystalline propylene-ethylene block copolymer having a melt flow rate of 3 g/10 min (as a polyolefin resin (A), hereinafter referred to as A-1), 1.0 part by weight of maleic anhydride (B), 0.5 part by weight of styrene (C), 0.048 part by weight of 1,3-bis(t-butylperoxyisopropyl)benzene (hereinafter referred to as D-1, Sanperox ®-TY1.3 manufactured by Sanken Kako Co., Ltd.) and 0.1 part by weight of Irganox ®1010 as a stabilizer (manufactured by Ciba-Geigy Ltd.). Thereafter the mixture was melt-kneaded with a single screw type extruder having a 30 mm-diameter screw at 230° C. for an average retention time of 1.8 minutes to obtain a graft-modified polyolefin resin. The resin had a melt flow rate of 3.2 g/10 min and an amount of bound maleic anhydride of 0.25% by weight.

Table 1 shows the results.

Comparative Example 1

The same procedure as in Example 1 was repeated except that styrene was not used. The results are shown in Table 1.

EXAMPLES 2 AND 3

The same procedure as in Example 1 was repeated except that the amounts used of styrene and maleic anhydride were changed to those shown in Table 1. Table 1 shows the results.

Comparative Example 2

The same procedure as in Example 2 was repeated except that styrene was not used. Table 1 shows the results.

EXAMPLE 4

The same procedure as in Example 1 was repeated except that the polyolefin resin (A-1) was replaced by a crystalline polypropylene having a melt flow rate of 1.5 g/10 min (hereinafter referred to as A-2). Table 1 shows the results.

Comparative Example 3

The same procedure as in Example 4 was repeated except that styrene was not used. Table 1 shows the results.

EXAMPLE 5

The same procedure as in Example 1 was repeated except that the free-radical initiator (D) was replaced by 0.6 part by weight of t-butylperoxylaurate (hereinafter referred to as D-2, Perbutyl ®L manufactured by Nippon Oil & Fats Co., Ltd.) and the amount of maleic anhydride was reduced to 0.5 part by weight. The results are shown in Table 1.

Comparative Example 4

The same procedure as in Example 5 was repeated except that styrene was not used. Table 1 shows the results.

EXAMPLE 6

The same procedure as in Example 1 was repeated except that 1.0 part by weight of the crystalline polypropylene (A-2) on which 8% by weight of 1,3-bis(t-butylperoxyisopropyl)benzene (D-1) (hereinafter referred to as AD) as a free-radical initiator (D) was melt-kneaded with a twin screw type extruder having 120 mm-diameter screws at 270° C. for 0.8 minutes for average retention time to obtain a modified polyolefin resin. The resin had a melt flow rate of 6.9 g/10 min and an amount of bound maleic anhydride of 0.29% by weight.

by weight of styrene, 0.6 part by weight of the above-described AD as a free-radical initiator and 0.1 part by weight of Irganox®1010 (manufactured by Ciba-Geigy Ltd.). Thereafter the mixture was melt-kneaded with a twin screw extruder (TEX 44 SS-30BW-2V manufactured by Nippon Seiko K. K.) at a kneading temperature of 220° C. for 1.5 minutes for average retention time to obtain a polypropylene modified with maleic anhydride and styrene. The modified polypropylene has an amount of bound maleic anhydride of 0.15% by weight, an amount of bound styrene of 0.07% by weight and a melt flow rate of 21 g/10 min.

Table 2 shows the results.

Comparative Example 5

The same procedure as in Example 6 was repeated except styrene was not used. As a result, a maleic anhydride-modified polypropylene having an amount of bound maleic anhydride of 0.08% by weight and a melt flow rate of 36 g/10 min.

Table 2 shows the results.

EXAMPLE 7

A modified polyolefin resin was prepared as follows:

A highly crystalline polypropylene (hereinafter referred to as A-4) was prepared according to the slurry polymerization process disclosed in JP-A-60-228504. The polypropylene had an intrinsic viscosity in tetralin at 135° C. of 2.42 dl/g, a melt flow rate of 1.6 g/10 min, a 20° C. cold xylene soluble of 0.6% by weight, a boiling heptane soluble of 2.9% by weight and an isotactic pentad of boiling heptane insoluble of 0.980. Modifying

TABLE 1

| | | Example 1 | Comparative Example 1 | Example 2 |
|---|---|---|---|---|
| Mixing ratio (part by weight) | Propylene-ethylene block copolymer (A-1) | 100 | 100 | 100 |
| | Crystalline polypropylene (A-2) | — | — | — |
| | Maleic anhydride (B) | 1.0 | 1.0 | 2.0 |
| | Styrene (C) | 0.5 | — | 0.5 |
| | Sanperox ® TY-1.3 (D-1) | 0.048 | 0.048 | 0.048 |
| | Perbutyl ® L (D-2) | — | — | — |
| | Irganox ® 1010 | 0.1 | 0.1 | 0.1 |
| Analytical data | Amount of bound maleic anhydride (wt %) | 0.25 | 0.19 | 0.38 |
| | Melt flow rate (g/10 min) | 3.2 | 60 | 10 |

| | | Example 3 | Comparative Example 2 | Example 4 | Comparative Example 3 | Example 5 | Comparative Example 4 |
|---|---|---|---|---|---|---|---|
| Mixing ratio (part by weight) | Propylene-ethylene block copolymer (A-1) | 100 | 100 | — | — | 100 | 100 |
| | Crystalline polypropylene (A-2) | — | — | 100 | 100 | — | — |
| | Maleic anhydride (B) | 2.0 | 2.0 | 1.0 | 1.0 | 0.5 | 0.5 |
| | Styrene (C) | 1.0 | — | 0.5 | — | 0.5 | — |
| | Sanperox ® TY-1.3 (D-1) | 0.048 | 0.048 | 0.048 | 0.048 | — | — |
| | Perbutyl ® L (D-2) | — | — | — | — | 0.6 | 0.6 |
| | Irganox ® 1010 | 0.1 | 0.1 | 0.1 | 0.1 | 0.3 | 0.3 |
| Analytical data | Amount of bound maleic anhydride (wt %) | 0.30 | 0.23 | 0.15 | 0.08 | 0.22 | 0.18 |
| | Melt flow rate (g/10 min) | 4.5 | 53 | 25 | 100 | 1.6 | 22 |

EXAMPLE 6

A modified polyolefin resin was prepared as follows:

A crystalline polypropylene was prepared according to the slurry polymerization process disclosed in JP-A-60-28405. The polypropylene had a melt flow rate of 1.3 g/10 min, an intrinsic viscosity in tetralin at 135° C. of 2.45 dl/g, a cold xylene soluble at 20° C. of 2.9% by weight, a boiling heptane soluble of 6.7% by weight, an isotactic pentad of boiling heptane insoluble of 0.955. It was modified in the following manner:

With a Henschel mixer were uniformly mixed 100 parts by weight of the above crystalline polypropylene (A-3), 1.0 part by weight of maleic anhydride, 0.5 part the polypropylene in the same manner as in Example 6 gave a highly crystalline polypropylene modified with maleic anhydride and styrene. It had an amount of bound maleic anhydride of 0.15% by weight, an amount of bound styrene of 0.07% by weight and a melt flow rate of 21 g/10 min.

Table 2 shows the results.

The results show that the modified resin obtained from the highly crystalline polypropylene has an improved flexural modulus, so that it is expected to have good stiffness and heat resistance although the modified resin obtained from the ordinary polypropylene shows good properties (Example 6).

Comparative Examples 6 and 8

Modified polyolefin resins were prepared in the same manner as in Example 7, in which the same starting materials were used but the mixing ratio was changed as shown in Table 2.

The results are shown in Table 2.

EXAMPLES 8 and 9

Comparative Examples 9 and 10

A modified polyolefin resin was prepared starting from the following propylene block copolymer (A-5).

A highly crystalline propylene-ethylene block copolymer was prepared according to the slurry polymerization process disclosed in JP-A-60-228504. The copolymer (A-5) had the following properties:

| | |
|---|---|
| Melt flow rate: | 3.0 g/10 min, |
| Intrinsic viscosity in tetralin at 135° C.: | 3.19 dl/g, |
| Content of the propylene homopolymer portion, the first segment produced in the first step of the polymerization (hereinafter referred to as the P portion): | 74% by weight, |
| Intrinsic viscosity of the P portion in tetralin at 135° C.: | 1.64 dl/g, |
| 20° C. Cold xylene soluble of the P Portion: | 1.6% by weight, |
| Boiling heptane soluble of the P portion: | 4.6% by weight, |
| Isotactic pentad of the boiling heptane insoluble of the P portion: | 0.975, |
| Intrinsic viscosity of the EP portion in tetralin at 135° C.: | 7.58 dl/g, and |
| Weight ratio of ethylene/propylene in the EP portion: | 48/52. |

The copolymer (A-5) was modified in the following manner:

With a Henschel mixer were uniformly mixed 100 parts by weight of the propylene block copolymer, 1.0 part by weight of maleic anhydride, 0.5 part by weight of styrene, 0.6 part by weight of the AD as a free-radical initiator and 0.1 part by weight of Irganox ®1010 (manufactured by Ciba-Geigy Ltd.). Thereafter the mixture was melt-kneaded with a twin screw type extruder (TEX 44 SS-30BE-2V manufactured by Nippon Seiko K.K.) at a kneading temperature of 220° C. for 1.5 minutes for the average retention time to obtain a highly crystalline propylene-ethylene block copolymer modified with maleic anhydride and styrene. The modified propylene-ethylene block copolymer had an amount of bound maleic anhydride of 0.33% by weight, an amount of bound styrene of 0.14% by weight and a melt flow rate of 10 g/10 min (Example 8).

The same procedure as in above was repeated except that styrene was not used. The resulting highly crystalline propylene-ethylene block copolymer modified with maleic anhydride had an amount of bound maleic anhydride of 0.20% and a melt flow rate of 39 g/10 min (Comparative Example 9).

A modified polyolefin resin was prepared starting from the following propylene-ethylene block copolymer (A-6).

A highly crystalline propylene-ethylene block copolymer (A-6) was prepared according to the gas phase polymerization process disclosed in JP-A-62-287917. The copolymer (A-6) had the following properties:

| | |
|---|---|
| Melt flow rate: | 1.3 g/10 min, |
| Intrinsic viscosity in tetralin at 135° C.: | 2.59 dl/g, |
| Content of the propylene homopolymer portion, the first segment produced in the first step of the polymerization (hereinafter referred to as the P portion): | 69% by weight, |
| Content of the ethylene-propylene copolymer portion, the second segment produced in the second step of the polymerization (hereinafter referred to as the EP portion): | 31% by weight, |
| Intrinsic viscosity of the P portion in tetralin at 135° C.: | 2.16 dl/g, |
| 20° C. Cold xylene soluble of the P portion: | 1.0% by weight, |
| Boiling heptane soluble of the P portion: | 4.4% by weight, |
| Isotactic pentad of the boiling heptane insoluble of the P portion: | 0.975, |
| Intrinsic viscosity of the EP portion in tetralin at 135° C.: | 3,55 dl/g, and |
| Weight ratio of ethylene/propylene in the EP portion: | 27/73. |

The block copolymer (A-6) was modified in the same manner as in Example 8 to obtain a highly crystalline propylene-ethylene block copolymer modified with maleic anhydride and styrene. The modified block copolymer had an amount of bound maleic anhydride of 0.37% by weight, an amount of bound styrene of 0.16% by weight and a melt flow rate of 29 g/10 min (Example 9).

The above-mentioned procedure was repeated except that styrene was not used. The resulting highly crystalline propylene-ethylene block copolymer modified with maleic anhydride had an amount of bound maleic anhydride of 0.22% by weight and a melt flow rate of 35 g/10 min (Comparative Example 10).

The results are summarized in Table 2.

TABLE 2

| | | Example 6 | Comparative Example 5 | Example 7 | Comparative Example 6 | Comparative Example 7 |
|---|---|---|---|---|---|---|
| Mixing ratio (part by weight) | Highly crystalline propylene-ethylene block copolymer (A-5) | — | — | — | — | — |
| | Highly crystalline propylene-ethylene block copolymer (A-6) | — | — | — | — | — |
| | Crystalline polypropyrene (A-3) | 100 | 100 | — | — | — |
| | Highly crystalline polypropyrene (A-4) | — | — | 100 | 100 | 100 |
| | Maleic anhydride (B) | 1.0 | 1.0 | 1.0 | 1.0 | 1.0 |
| | Styrene (C) | 0.5 | — | 0.5 | 0.5 | 1.2 |
| | Sanperox ® TY-1.3 (D-1) | 0.048 | 0.048 | 0.048 | — | — |
| | Irganox ® 1010 | 0.1 | 0.1 | 0.1 | 0.1 | 0.1 |
| Analytical data | Amount of bound maleic anhydride (wt %) | 0.15 | 0.08 | 0.15 | 0.01 | 0.01 |
| | Melt flow rate (g/10 min) | 21 | 36 | 21 | 10 | 10 |
| Physical | Flexural modulus (kgf/cm$^2$) (23° C.) | 13200 | 12100 | 16400 | 16,300 | 15,900 |

TABLE 2-continued

| properties | Izod Impact (kgf · cm/cm²) (23° C.) | 3.2 | 2.0 | 4.0 | 2.0 | 2.1 |
| --- | --- | --- | --- | --- | --- | --- |
| | | Comparative Example 8 | Example 8 | Comparative Example 9 | Example 9 | Comparative Example 10 |
| Mixing ratio (part by weight) | Highly crystalline propylene-ethylene block copolymer (A-5) | — | 100 | 100 | — | — |
| | Highly crystalline propylene-ethylene block copolymer (A-6) | — | — | — | 100 | 100 |
| | Crystalline polypropyrene (A-3) | — | — | — | — | — |
| | Highly crystalline polypropyrene (A-4) | 100 | — | — | — | — |
| | Maleic anhydride (B) | 1.0 | 1.0 | 1.0 | 1.0 | 1.0 |
| | Styrene (C) | 1.2 | 0.5 | — | 0.5 | — |
| | Sanperox ® TY-1.3 (D-1) | 0.048 | 0.048 | 0.048 | 0.048 | 0.048 |
| | Irganox ® 1010 | 0.1 | 0.1 | 0.1 | 0.1 | 0.1 |
| Analytical data | Amount of bound maleic anhydrdie (wt %) | 0.17 | 0.33 | 0.20 | 0.37 | 0.22 |
| | Melt flow rate (g/10 min) | 21 | 10 | 39 | 29 | 35 |
| Physical properties | Flexural modulus (kgf/cm²) (23° C.) | 17,000 | 12,200 | 11,100 | 6,900 | 6,500 |
| | Izod Impact (kgf · cm/cm²) (23° C.) | 1.9 | 21.0 | 21.0 | 65.1 | 64.5 |

EXAMPLE 10

A modified polyolefin resin was prepared starting from the following propylene-ethylene block copolymer:

A propylene-ethylene block copolymer (A-7) was prepared according to the gas phase polymerization process disclosed in Japanese Patent Application No. 62-256015. The copolymer (A-7) had the following properties.

| | |
| --- | --- |
| Melt flow rate: | 0.1 g/10 min, |
| Intrinsic viscosity in tetralin at 135° C.: | 3.0 dl/g, |
| Content of the propylene homopolymer portion, the first segment produced in the first step of the polymerization (hereinafter referred to as the P portion): | 23% by weight, |
| Content of the ethylene-propylene copolymer portion, the second segment produced in the second step of the polymerization (hereinafter referred to as the EP portion): | 77% by weight, |
| Intrinsic viscosity of the P portion in tetralin at 135° C.: | 2.00 dl/g, |
| 20° C. Cold xylene soluble of the P portion: | 2.8% by weight, |
| Boiling heptane soluble of the P portion: | 6.4% by weight, |
| Isotactic pentad of the boiling heptane insoluble of the P portion: | 0.960, |
| Intrinsic viscosity of the EP portion in tetralin at 135° C.: | 3.30 dl/g, and |
| Weight ratio of ethylene/propylene in the EP portion: | 20/80. |

The copolymer (A-7) was modified in the same manner as in Example 8. The resulting propylene-ethylene block copolymer modified with maleic anhydride and styrene had an amount of bound maleic anhydride of 0.67% by weight, an amount of bound styrene of 0.29% by weight and a melt flow rate of 0.1 g/10 min.

Table 3 shows the results.

EXAMPLE 11

Comparative Example 11

The same procedure as in Example 7 was repeated except that maleic anhydride was replaced by glycidyl methacrylate (hereinafter referred to as B-1) to obtain a modified polyolefin resin (Example 11).

The same procedure as in Example 11 was repeated except that styrene was not used to obtain a modified polyolefin resin (Comparative Example 11).

The results are summarized in Table 3.

TABLE 3

| | | Example 10 | Example 11 | Comparative Example 11 |
| --- | --- | --- | --- | --- |
| Mixing ratio (part by weight) | Propylene-ethylene block copolymer (A-7) | 100 | — | — |
| | Highly crystalline polypropylene (A-4) | — | 100 | 100 |
| | Maleic anhydride (B) | 1.0 | — | — |
| | Glycidyl methacrylate (B-1) | — | 1.0 | 1.0 |
| | Styrene (C) | 0.5 | 0.5 | — |
| | Sanperox ® TY-1.3 (D-1) | 0.048 | 0.048 | 0.048 |
| | Irganox ® 1010 | 0.1 | 0.1 | 0.1 |
| Analytical data | Amount of bound maleic anhydride (wt %) | 0.67 | — | — |
| | Amount of bound glycidyl methacrylate (wt %) | — | 0.09 | 0.04 |
| | Melt flow rate (g/10 min) | 0.1 | 22 | 40 |
| Physical properties | Flexural modulus (kgf/cm²) (23° C.) | 700 | 16,000 | 15,200 |
| | Izod Impact (kgf · cm/cm²) (23° C.) | >100 | 3.5 | 2.0 |

The modified polyolefin resin provided in the above Examples was dissolved in hot xylene and then precipitated with acetone for purification. The infrared spectrum of the precipitate showing the absorption peaks assigned to styrene demonstrated that styrene was grafted on the polyolefin resin as well as maleic anhydride.

Additionally, attributable to the graft of styrene, the modified polyolefin resins of the present invention were more transparent than the resins provided in the above Comparative Examples.

As described above, the modified polyolefin resin of the present invention has the following merits:

(1) The amount of bound unsaturated carboxylic acid, a derivative thereof or unsaturated epoxy compound is high.

(2) The change of the melt flow rate during the modification is small.

(3) The flexural modulus and impact resistance are of high grade.

(4) The transparency is improved due to the graft of unsaturated aromatic monomer.

According to the present invention, there is provided a modified polyolefin resin having the above advantages which has not been able to prepare in the prior art.

What is claimed is:

1. A modified polyolefin resin obtained by melt-kneading a mixture consisting of
   (A) 100 parts by weight of a polyolefin resin having a melt flow rate of 0.05–60 g/10 min.,
   (B) 0.1–5 parts by weight of at least one compound selected from the group consisting of unsaturated carboxylic acids, the derivatives thereof and unsaturated epoxy compounds,
   (C) 0.1–5 parts by weight of an unsaturated aromatic compound and
   (D) 0.01–2 parts by weight of a free-radical initiator, the molar ratio of (B)/(C) ranging from 1/0.1 inclusive to 1/1 exclusive.

2. A resin according to claim 1, wherein the constituent (B) is maleic anhydride.

3. A resin according to claim 1, wherein the constituent (B) is glycidyl acrylate or glycidyl methacrylate.

4. A resin according to claim 1, wherein the constituent (C) is styrene.

5. A resin according to claim 1, wherein the constituent (A) is a crystalline polypropylene or a crystalline propylene copolymer.

6. A resin according to claim 1 which has a melt flow rate falling in the range of 0.1–100 g/10 min.

7. A resin according to claim 5, wherein the propylene homopolymer portion in the crystalline polypropylene or crystalline propylene copolymer has an isotactic pentad of boiling heptane insoluble of not less than 0.970 and a boiling heptane insoluble of not more than 5.0% by weight based on the weight of the propylene homopolymer portion.

8. A resin according to claim 5, wherein the crystalline propylene copolymer is a propylene-ethylene block copolymer containing 20–80% by weight of the propylene-ethylene copolymer portion and 80–20% by weight of the propylene homopolymer portion produced by gas phase polymerization.

* * * * *